April 21, 1953
I. G. STEMM ET AL
2,635,827
REEL SLED FOR CABLE
Filed June 28, 1949
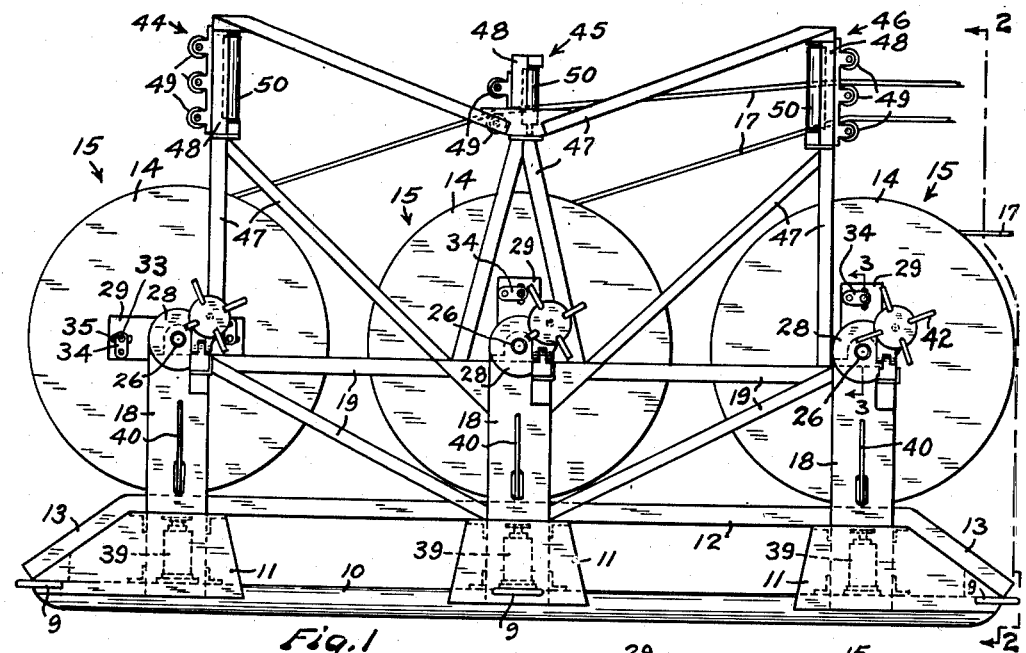
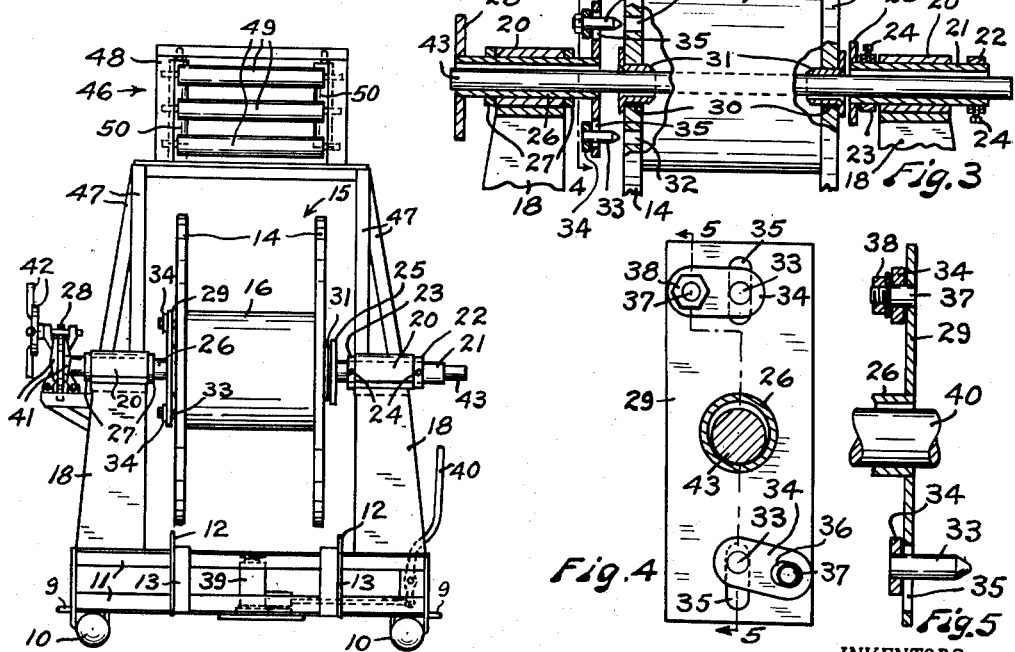
INVENTORS.
IRWIN G. STEMM
DANIEL H. ZWIGHT
BY Fred C. Matheny
ATTORNEY Patented Apr. 21, 1953

2,635,827

UNITED STATES PATENT OFFICE 2,635,827

REEL SLED FOR CABLE

Irwin G. Stemm and Daniel H. Zwight, Leavenworth, Wash.

Application June 28, 1949, Serial No. 101,828

2 Claims. (Cl. 242—85)

This invention relates to a reel sled for supporting reels of heavy transmission line cable while unwinding the same.

Objects of this invention are to provide a reel sled which is well adapted for use in rough and mountainous country and which will support large reels of heavy transmission line cable in such a manner as to save labor, time and expense in the stringing of the cable between transmission line towers.

Another object is to provide, on a reel sled of this type, efficient means for holding and applying brake force to the reels on which large heavy cable is wound and to construct the reel holding means so that it is self adjusting or self centering on reels having inaccurately positioned holes or recesses with which the reel holding means engages.

Cables used in transmission line construction are often an inch or more in diameter and are made of relatively heavy material. It is common practice to wind on each reel a length of cable sufficient to reach from one transmission line tower to the next adjacent tower in the line. In rough or mountainous country these towers are liable to be as much as four thousand feet apart and it is not unusual to have four thousand or more feet of cable on a single reel. Obviously with this great weight of cable on a reel it is difficult for construction crews to handle the reel and to properly position the same on the reel sled and to efficiently hold the reel and control the speed of the same during the unwinding of the cable.

Furthermore it is desirable to provide a reel sled which will support three of these reels at one time so that as many as three of these heavy cables may be drawn out and strung at one time. The sled is preferably held stationary and the three cables are drawn out at one operation by a tractor from a tower adjacent the sled to the next tower in the line. It is desirable to maintain tension on these cables and to keep the cables from dragging on the ground and from winding around each other and an object of our invention is to provide a reel sled which makes it possible to accomplish these purposes.

The reels on which this heavy cable is wound are of spool shape and have side walls provided with holes positioned at a substantial distance from the axes of the reels. These holes are in the same general locations in all instances but are inaccurately positioned and are liable to be at different radial distances from the center of the reel. The brake means of this reel sled connects with the reels by means of a plate having pins which engage within these holes in the reels. It is an object of this invention to provide a plate having thereon pins which are removably and adjustably connected with the plate by strong and durable means which allows enough radial movement of the pins to make them self adjusting to the holes within the limits between which the holes will ordinarily vary.

Other objects of this invention will be apparent from the following description taken in connection with the accompanying drawings.

In the drawings Figure 1 is a view in side elevation of a reel sled constructed in accordance with this invention showing three reels supported thereon and cables taking off from the reels.

Fig. 2 is a view in end elevation of the same looking in the direction of broken line 2—2 of Fig. 1, the cables being omitted.

Fig. 3 is a fragmentary sectional view, on a larger scale than Figs. 1 and 2, taken substantially on broken line 3—3 of Fig. 1.

Fig. 4 is a detached view partly in elevation and partly in section and with parts omitted looking in the direction of broken line 4—4 of Fig. 3, showing self adjusting means for making connection between a reel and brake means therefor.

Fig. 5 is a sectional view, with parts in elevation, taken substantially on broken line 5—5 of Fig. 4.

Like reference numerals designate like parts throughout the several views.

This reel sled comprises two spaced apart parallel sled runners 10 which preferably are strong heavy metal pipes and which are rigidly connected with each other by frame means 11. Two spaced apart parallel track members 12, preferably angle bars, are supported by the frame means 11 and extend lengthwise of the sled. The major portions of these track bars 12 are spaced a substantial distance above the plane of the sled runners 10 and the end portions 13 of these track bars are inclined downwardly and terminate in close proximity to the ends of the sled runners 10. The track members 12 form part of the sled frame and serve as tracks whereon circular end flanges or walls 14 of reels 15 may roll when these reels are being moved onto or off of the sled.

The reels 15 have centrally disposed cylindrical drum portions 16 on which cable 17 may be wound.

Preferably both ends of the sled runners 10 are beveled in the usual manner and preferably rigid metal loops or clips 9 are welded to these sled runners to receive draw means and anchor means.

Three upright supports 18 are provided along each side of the sled in spaced apart relation. Suitable truss bracing 19 is provided in connection with these supports 18 to provide strength and rigidity. The supports 18 are arranged in pairs transversely of the sled and each support has a tubular bearing member 20 secured to the top end portion thereof. Each pair of upright supports 18 is adapted to support one reel 15. The devices used for supporting the several reels 15 are similar and are similarly numbered and the following description will apply to each set of these reel supporting devices.

The bearing member 20 on one of the upright supports 18 of each pair, such as the upright support 18 shown at the right in Figs. 2 and 3, has a bearing tube 21, preferably rotatively supported therein. Two set collars 22 and 23 are adjustably and releasably secured on the bearing tube 21, as by set screws 24. The set collars 22 and 23 make possible longitudinal adjustment of the bearing tube 21 in its bearing member 20 and serve to hold said bearing tube 21 in adjusted positions. A circular thrust plate or disc 25 is welded or otherwise rigidly secured to the inner end portion of the bearing tube 21.

The bearing member 20 at the opposite side of the sled, such as the side shown at the left in Figs. 2 and 3, has a bearing tube 26 rotatively mounted therein. Two collars 27 are welded or otherwise fixedly secured to the rotatable bearing tube 26 adjacent the two ends of the bearing member 20 to prevent longitudinal displacement of tube 26. A brake disc 28 is welded or otherwise fixedly secured to the outer end portion of the rotatable bearing tube 26. A reel engaging plate 29, see also Figs. 4 and 5, is welded or otherwise rigidly secured to the inner end portion of the rotatable bearing tube 26.

The circular end walls 14 of the reels 15 each have an axial opening 30 provided therein and preferably two flanged metal thimbles 31 are provided for insertion into these openings in each reel before the reel is mounted on the sled.

Also each end flange of each reel is ordinarily provided with two or more substantially diametrically oppositely positioned openings 32, herein termed pin receiving holes, which are positioned at a substantial distance from the center of the reel. These pin receiving holes 32 are not accurately positioned and the radial distances of the holes 32 in different reels or of the holes 32 in the same reel may vary several inches. These pin receiving holes 32 are used as a means for connecting brake controlled devices to the reel so that a retarding or brake force can be exerted on the reel. As shown in the drawings pins 33 are carried by the plate 29 for engagement within the pin receiving holes 32.

To compensate for the variation in the positioning of the pin receiving openings 32 the pins 33, which are carried by the plate 29 are mounted so that they are radially movable. To do this each pin 33 is welded or otherwise rigidly secured to a flat metal member 34, herein termed a pin carrying arm, and each pin 33 projects through a radial slot 35 in the reel engaging plate 29.

Each pin carrying arm 34 has a longitudinal slot 36 which fits over and is slidably and pivotally mounted on a rigid stud 37 on the reel engaging plate 29. The slot 36 is not long as only a small amount of longitudinal movement of the arm 34 is needed. This movement could be provided by the use of an oversize hole in place of the slot 36. Each stud 37 is transversely offset to one side of the adjacent slot 35. Also each stud 37 is shouldered and the smaller outer end portion thereof is threaded for the reception of a plate holding nut 38. Each slot 36 is of sufficient length to allow enough longitudinal movement of its arm 34 so that the pin 33 on said arm 34 can be moved from end to end of the slot 35 in which it operates. The slots 35 allow enough movement of the pins 33 to compensate for the maximum variations which ordinarily occur in radial positioning of different pin receiving holes 32.

The parts 33 to 38 inclusive preferably are provided in duplicate on the two end portions of the plate 29 thus providing for connection with a reel at two diametrically opposite points. Obviously only one set of these parts 35 to 38 could be used but the connection with the reel would not be as well balanced or as efficiently made as where two sets are used.

Preferably three jacks 39, of any suitable type capable of lifting the required loads, and having lever means 40 by which they may be operated are provided under the locations where the three respective reels are supported. Usually the cable on the reel is enclosed within a shell of strong material which forms a circumferential wall on the reel. The jacks may engage with this shell for the purpose of lifting a reel.

Brake shoes 41 are positioned for braking engagement with the brake disc 28 and suitable devices for applying the shoes 41 to the disc 28 are provided and are anchored to a fixed part of the sled frame and are adapted to be operated as by hand wheel means 42. This brake mechanism is of well known conventional construction and is not herein described in detail.

The reels 15, with cable thereon, may be mounted on the sled by rolling them into the proper positions along the track members 13, 12. Preferably flanged thimbles 31 are applied to each end of each reel. After the reels are moved into position they may be lifted by the jacks 39 to approximately align the thimbles 31 and bearing tubes 21 and 26. A relatively strong axle bar 43 may then be inserted through the bearing tubes 21 and 26 and through the reel to support said reel for rotation. The track members may be positioned so that a reel can be rolled in alongside of the plate 29 and pins 33, then lifted and suspended on an axle member 43 and then pushed toward the plate 29 to properly position the pins 33 in the pin receiving holes 32. After this has been done the tube 21 and plate 25, which were retracted or moved outwardly while the reel was being brought onto the sled, are moved toward the reel and locked by making fast the set collar 23 to hold the reel in engagement with the pins 33. Another way of bringing in the reels or positioning them on the sled is to remove the nuts 38 and withdraw the pins out of the way while the reels are being moved into place and then insert the pins 33 in the pin receiving holes and apply the nuts 38.

The adjustable mounting of the pins 33 on the plates 29 is advantageous in that it saves time and trouble and provides a better and more efficient means for making connection between the reels and the brake means than can be obtained otherwise.

The cables 17 from three reels are usually unwound simultaneously and it is desirable to provide means for supporting these cables in spaced apart relation as they come off of the respective reels. For this purpose we provide, preferably three, cable guiding devices 44, 45 and 46 of the type commonly known as fair-leads. These fair-leads 44, 45 and 46 are supported above the three reels on the sled, as by suitable frame means 47. Each fair-lead comprises a rectangular frame 48 having a plurality of spaced apart horizontal rollers 49 between which cables 17 may pass. Each fair-lead also has two widely spaced apart vertical rollers 50 adjacent the lateral sides of the frame 48. The cables may be taken off in either direction from the sled over these fair-leads. The cable from the foremost reel does not need to pass through a fair-lead. The cable from the medial reel 15 preferably passes between the two lowermost rollers 49 of the foremost fair-lead and the cable from the rearmost reel passes through the medial fair-lead and between the two uppermost rollers of the foremost fair-lead. As only one cable is guided by the medial fair-lead 45 it does not need to have as many horizontal rollers 49 as do the other fair-leads. Also, in some instances it is possible to dispense with the medial fair-lead 45 entirely.

As the cables 17 are drawn out the brake means for each reel is used to maintain proper cable tension and to prevent the cables from fouling or dragging on the ground.

The foregoing description and accompanying drawings clearly disclose a preferred embodiment of this invention but it will be understood that this disclosure is merely illustrative and that changes in this apparatus may be made within the scope and spirit of the following claims.

We claim:

1. In a reel sled adapted to support any one of a plurality of different large heavy reels which have pin receiving holes in their side walls and in which the radial distances of the pin receiving holes from the axes of the reels differ in different reels; means adapted to support a reel for axial rotation; a brake controlled plate supported for rotation on the same axis as said reel supporting means and positioned so that it will be alongside of a reel when a reel is supported on said reel supporting means, said plate having a radial slot positioned outwardly from the axis of rotation of the plate; a pin carrying arm; slot and pin type pivot means transversely spaced from said radial slot pivotally mounting said pin carrying arm on said plate and providing for limited longitudinal movement of said pin carrying arm; and a pin rigid with said pin carrying arm extending through and movably supported in said radial slot and adapted to extend into a pin receiving hole in a side wall of said reel when a reel is supported on said reel supporting means.

2. A reel sled adapted to support any one of a plurality of different large heavy reels which have axial passageways and which have pin receiving holes in their side walls and in which the radial distances of the holes from said axial passageways differ in different reels, comprising two spaced apart aligned bearing tubes; means rotatively supporting at least one of said bearing tubes; brake means connected with the rotatively supported bearing tube; means adapted to be inserted through said two bearing tubes and through the axial passageway in a reel to rotatively support a reel between said bearing tubes; a plate rigidly secured to the inner end portion of the rotatively supported bearing tube crosswise thereof and spaced from the inner end portion of the other bearing tube to provide space between the bearing tubes to receive a reel, said plate having a radial slot therein at a substantial distance outwardly from the bearing tube; a stud bolt rigid with said plate and positioned alongside of and in transversely spaced relation from said radial slot; a pin carrying arm having in one end portion a longitudinally elongated hole through which said stud bolt extends, whereby said pin carrying arm is supported for swinging movement and for limited longitudinal movement; a nut on the outer end of said stud bolt removably securing said pin carrying arm thereon; and a pin rigid with said pin carrying arm and extending through and movably supported in said radial slot of said plate and adapted to be engaged within a pin receiving hole in a side wall of the reel when a reel is supported between said bearing tubes on said reel supporting means.

IRWIN G. STEMM.
DANIEL H. ZWIGHT.

References Cited in the file of this patent

UNITED STATES PATENTS

| Number | Name | Date |
|---|---|---|
| 355,090 | Kampf | Dec. 28, 1886 |
| 465,281 | Meyer | Dec. 15, 1891 |
| 489,742 | Hoffstaedt et al. | Jan. 10, 1893 |
| 511,232 | Brazee | Dec. 19, 1893 |
| 709,932 | Schooley | Sept. 30, 1902 |
| 808,424 | Wyckoff et al. | Dec. 26, 1905 |
| 824,290 | Eichhoff | June 26, 1906 |
| 1,357,470 | Perry | Nov. 2, 1920 |
| 1,513,061 | Muth | Oct. 28, 1924 |
| 1,693,876 | Unruh | Dec. 4, 1928 |
| 1,836,815 | Reeves | Dec. 15, 1931 |
| 2,073,437 | Zinter | Mar. 9, 1937 |